United States Patent [19]

Byrne et al.

[11] 3,956,678

[45] May 11, 1976

[54] ELECTRODYNAMIC SYSTEM COMPRISING A VARIABLE RELUCTANCE MACHINE

[75] Inventors: John Byrne, Dalkey; James C. Lacy, Dublin, both of Ireland

[73] Assignees: John Byrne; James G. Lacy, both of Dublin, Ireland

[22] Filed: Aug. 7, 1973

[21] Appl. No.: 386,347

Related U.S. Application Data

[63] Continuation of Ser. No. 230,720, March 1, 1972, which is a continuation-in-part of Ser. No. 49,619, June 25, 1970, abandoned.

[52] U.S. Cl. ............................. 318/138; 318/254; 310/168; 310/193; 310/216
[51] Int. Cl.² ..................... H02K 1/06; H02K 29/04
[58] Field of Search ........... 318/138, 254, 233, 236, 318/237; 310/168, 193, 162, 216

[56] References Cited
UNITED STATES PATENTS

| | | | |
|---|---|---|---|
| 3,171,049 | 2/1965 | Jarret et al. | 310/193 |
| 3,448,310 | 6/1969 | Lawrenson | 310/162 |
| 3,629,675 | 12/1971 | Porath | 318/138 |
| 3,675,059 | 7/1972 | Thees | 310/162 |
| 3,678,352 | 7/1972 | Bedford | 318/138 |
| 3,679,953 | 7/1972 | Bedford | 318/254 |

*Primary Examiner*—Robert K. Schaefer
*Assistant Examiner*—John J. Feldhaus

[57] ABSTRACT

Stepping motor techniques are made viable for heavy duty machines with variable speed operation (motors or generators) by reason of the simplification and gain in specific output and efficiency which results from constructions ensuring maximum saturation of magnetic flux at the stator pole faces and with minimal airgap between the associated stator and rotor pole faces. The density of the ferro-magnetic material forming the arcuate faces of the rotor poles may be varied (graded) circumferentially of said faces and the poles relatively shaped and arranged so as to render possible uni-directional current, 2-phase operation. Energy stored is minimised and the reduced energy inductively stored is returned to the source by vestigial coupled windings. Uni-directional currents only flow in the windings, and the switching circuitry, although not fundamentally novel, is greatly simplified.

8 Claims, 18 Drawing Figures

Fig. 9.
Linear

Fig. 10
Ideally saturated

Fig. 11
Linear

Fig. 12
Ideally saturated

Magnetization characteristics $\psi - j$ of experimental machine, with operating locus for motor action shown by arrows.

ELECTRODYNAMIC SYSTEM COMPRISING A VARIABLE RELUCTANCE MACHINE

This is a continuation of application Ser. No. 230,720, filed Mar. 1, 1972, which is in turn a continuation in part of Ser. No. 49,619 filed June 25, 1970, now abandoned.

BACKGROUND OF THE INVENTION

This invention relates to an electrodynamic system comprising a variable reluctance machine with a stator frame, several stator poles, a rotor, several rotor poles and a main winding supported by the stator poles, in combination with a rotor position transducer means and a semiconductor controlled uni-directional current source connected with its output side to the winding and with its input side to said means, the current varying between a maximum and a minimum value in time synchonism with the rate of change of the degree of overlapping between rotor and stator pole surfaces.

The reluctance machine referred to, whether a motor or generator, may be considered to belong to the so-called "stepping-motor" type, but whereas hitherto such machines have been only capable of use for purposes where relatively low power is required, for example, for step-wise operation of machine tools, by means of the electrodynamic system and improved construction of reluctance machine according to the invention continuous operation with improved torque and greatly improved efficiency may be obtained, there being extremely low inductive energy storage, with corresponding more complete conversion of instantaneous electrical input to mechanical output, or vice versa in the case of a generator, over a controllable range. Consequently the invention renders economically possible the use of a reluctance motor for such purposes as vehicle traction or for industry generally, the system enabling the operation of the motor to be readily controlled with less complicated and expensive circuitry arrangements than hitherto proposed for conventional electrical machines. A particularly high efficiency ratio, i.e. output/input, is also obtained when the machine is operated as a generator.

Magnetic saturation has heretofore been regarded as a factor limiting the performance of electrical machines. In the reluctance machine provided by the invention however, special steps are taken to ensure magnetic saturation, which is restricted to the interface areas where stator and rotor pole faces overlap, as a result of which the tangential force produced between the over-lapping pole faces may be almost doubled in comparison with known constructions.

In order to explain the basis of the invention and the means whereby the abovementioned objects are achieved reference is made in the following description to a number of diagrams which are shown in FIGS. 3, 4, 5, 6, 7, 8, 9, 10, 11, 12 and 13, of the accompanying drawings, a full list of which is given below.

It is known that for single-excited non saturating poled devices a maximum of only one half of the electrical power input at constant current can be converted to mechanical form, the remainder being stored inductively. For the idealised saturated case it will be shown that the elimination of inductive energy storage leads to a doubling of the energy converted to mechanical form. The results are most meaningful to the invention when related to the pole overlap zone where the forces act. This zone may be considered to be "driven" by the magneto motive force $F$ developed across the airgap for the magnetically linear case (FIG. 4), or across saturated ferro-magnetic material in the saturated case (FIG. 5). It will be shown that the tangential force between overlapping surfaces approaches ideal values:

$f$ (newtons) $= 0.5$ $FBL$ for the magnetically linear case (1)

$f$ (newtons) $= FBL$ for the saturated case (2)

$B$ is the flux-density normal to the overlapped surfaces.

$L$ is transverse length of the overlapped surfaces.

The equation (1) is well known, but equation (2) is new and unexpected.

Figure 6:
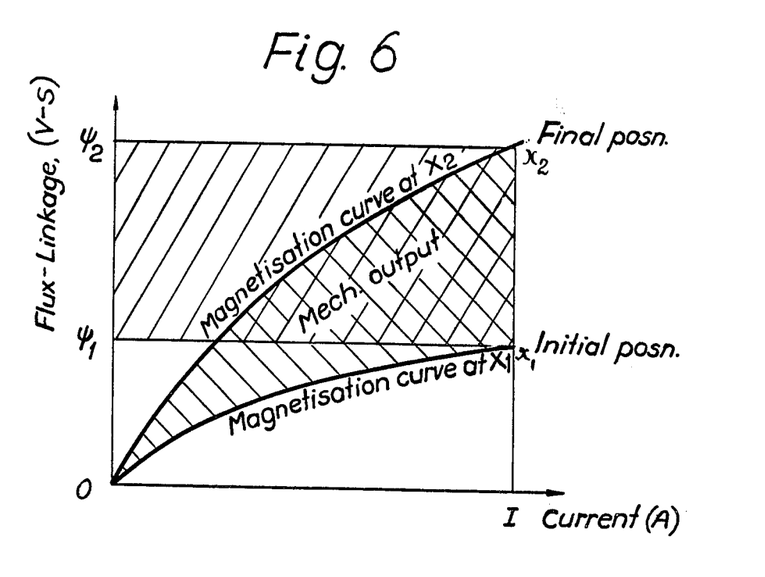
FIG. 6 is a diagram showing the relation of flux linkage to current for two positions of pole overlap with partial saturation.

FIG. 6 shows two of a family of curves describing the magnetization characteristic of a device as a function of a mechanical displacement $x$. The mechanical energy output at constant current is given by the increase in co-energy $\Delta N_{fld}'$ shown by the curve-bounded hatched area $x_1$, $x_2$, $0$, while the electrical energy input is given by the rectangular hatched area $\psi_1$, $\psi_2$, $x_1$, $x_2$. The average force (or torque) is the curved hatched area divided by the mechanical displacement $$f = \frac{dW'_{fld}}{dx} \qquad \text{For linear machine} \qquad (4)$$

$$T = \frac{dW'_{fld}}{d\theta} \qquad \text{For rotary machine}$$

The overlap is assumed to be sufficient to make the end fringing effects dependent on the driving magneto motive forces $F$ only, so that a displacement $\Delta x$ at constant current merely extends the middle zone wherein the flux and stored energy spatial distributions are uniform. The magnetization characteristic of the overlap zone can be described by a $B - F$ relation as in FIG. 8. Outside the overlap zone (dotted boundaries), the iron is assumed to be infinitely permeable.

Figure 8:
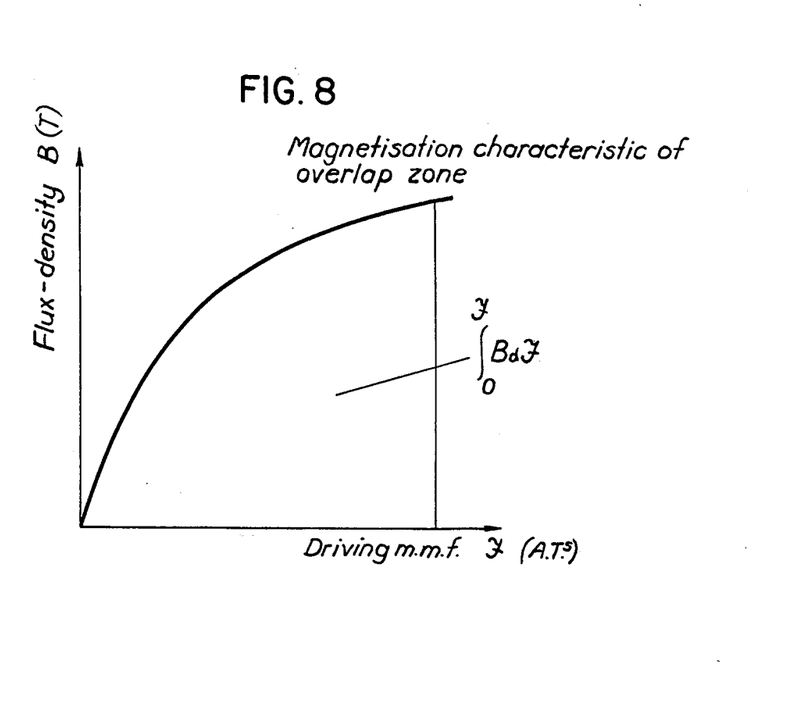

For the displacement $\Delta x$, which introduces an extra flux $\Delta \phi = BL\Delta x$ where $L$ is the transverse length, $$F(BL\Delta x) = f\Delta x + L\Delta x \int_0^B db$$

$$\underbrace{\text{Electric input}}_{} = \underbrace{\text{mechanical output}}_{} + \underbrace{\text{extra stored energy}}_{} \int Fd\phi$$

dividing through by $L\Delta x$ and re-arranging $$f/L = FB - \int_0^B FdB \qquad (5)$$

or, referring to FIG. 8
transverse force density $$f/L = \int_0^F BdF \quad \text{Newtons/meter} \qquad (6)$$

Effectively, Equation 6 is a variant of the general statement of Equation 4 that mechanical force is given by the rate of change of co-energy with respect to mechanical displacement. it may be noted that the driving magneto motive force $F$ is not restricted to one source but may be the resultant of a number of component magneto motive forces.

Figure 4:
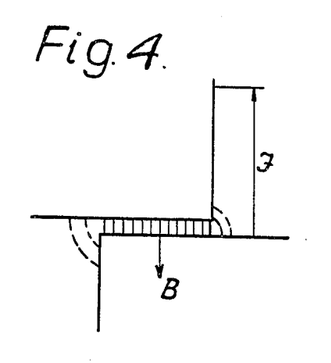
Figure 5:
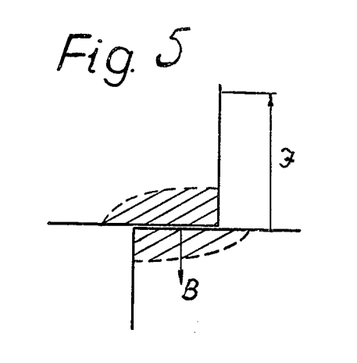

In the magnetically linear case the driving mmf is taken to be completely developed across an airgap such as that of FIG. 4. In the ideal saturated case, FIG. 5, the driving mmf is taken to be completely developed across saturated material having an infinitely narrow rectangular hysteresis loop.

Figure 9:
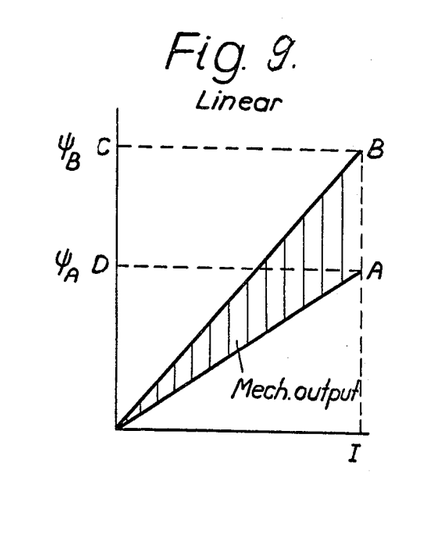
Figure 10:
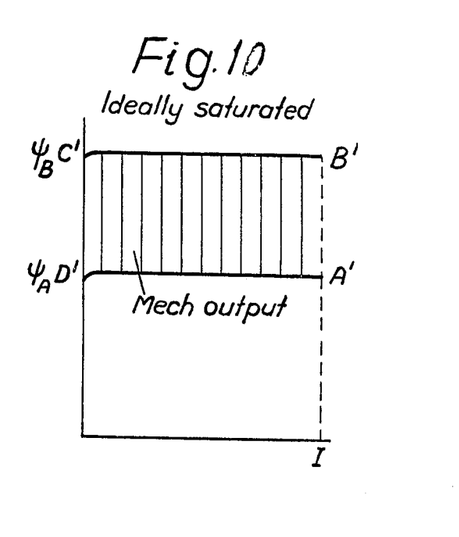

Corresponding to FIG. 6, FIGS. 9 and 10 compare the characteristics of the two cases, the gap flux densities, dimensions, etc., being presumed the same.

The electrical energy input, as the flux linkage increases from $\psi_A$ to $\psi_B$ at constant current, is the same for the two cases, being the rectangular areas $ABCD$ and $A'B'C'D' = I \Delta\psi$.

For the magnetically linear case, the mechanical output is the triangular hatched area $OAB = 0.5\, I\Delta\psi$. The increase in field stored energy is therefore, by difference, also equal to $0.5\, I\Delta\psi$. This is the well-known result for singly excited linear "reluctance-type" devices that, at constant current, a maximum of one half of the electrical input is convertible to mechanical form.

For the ideally saturated case, the mechanical output is the hatched area $A'B'C'D' = I\Delta\psi$. There is no inductively stored energy. The electrical input is completely converted to mechanical output.

Figures 11, 12:
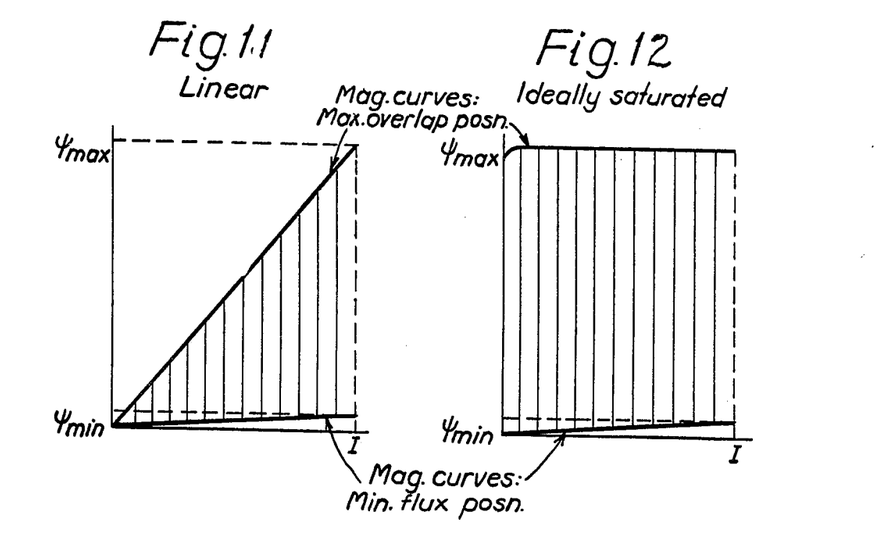

Only a limited displacement has been considered above. In FIGS. 11 and 12 saturation curves corresponding to the positions for maximum and minimum flux are represented. Ideally, the minimum flux would be a negligible fraction of the maximum flux.

The total energy input, as the flux linkage increases from $\psi_{min}$ to $\psi_{max}$ at constant current, is $I(\psi_{max} - \psi_{min})$ in both cases. The mechanical output energies correspond to the areas shown cross-hatched. If the minimum flux can be considered a negligible fraction of the maximum flux, $$\text{electrical input energy} = I\phi_{max} = F\phi_{max} = \quad (7)$$
$$\text{mechanical output energy for the ideal saturated case} = I\phi_{max} = F\phi_{max} \quad (8)$$
$$\text{mechanical output energy for the ideal linear case} = \tfrac{1}{2} I\phi_{max} = \tfrac{1}{2} F\phi_{max} \quad (9)$$
$$= \tfrac{1}{2} L_{max} I^2$$

Figure 7:
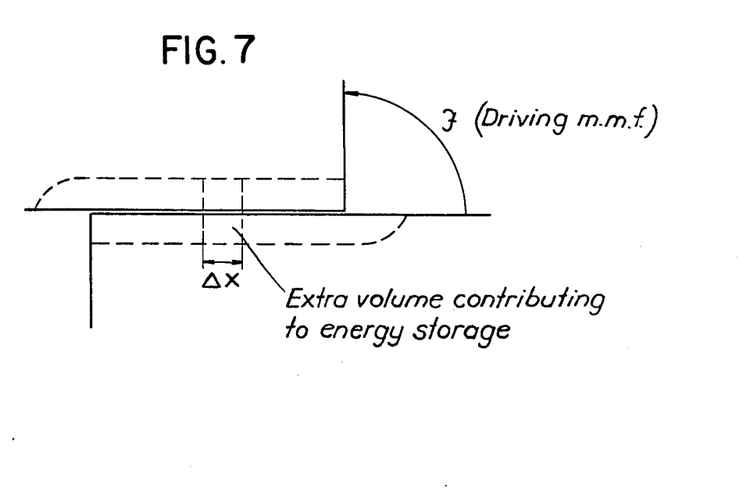
FIG. 7 shows diagrammatically the extra flux introduced by an incremental displacement.

Reverting now to the particular case of FIG. 7, the mechanical force equations 5 and 6 reduce to very simple form. For the magnetically linear case $$\int_0^B F\,db = \int_0^F B\,dF = \tfrac{1}{2} FB$$

$$f/l = \tfrac{1}{2}\, FB \text{ newtons/meter} \quad (10)$$

For ideally saturated case $$\int_0^B F\,db = \phi$$

$$f/l = FB \text{ newtons/meter} \quad (11)$$

In applying the aforementioned principles to obtain efficient energy conversion, it will be clear that the means should include for maximizing the cross-hatched area representing mechanical work shown in FIGS. 11 and 12.

Figure 13:
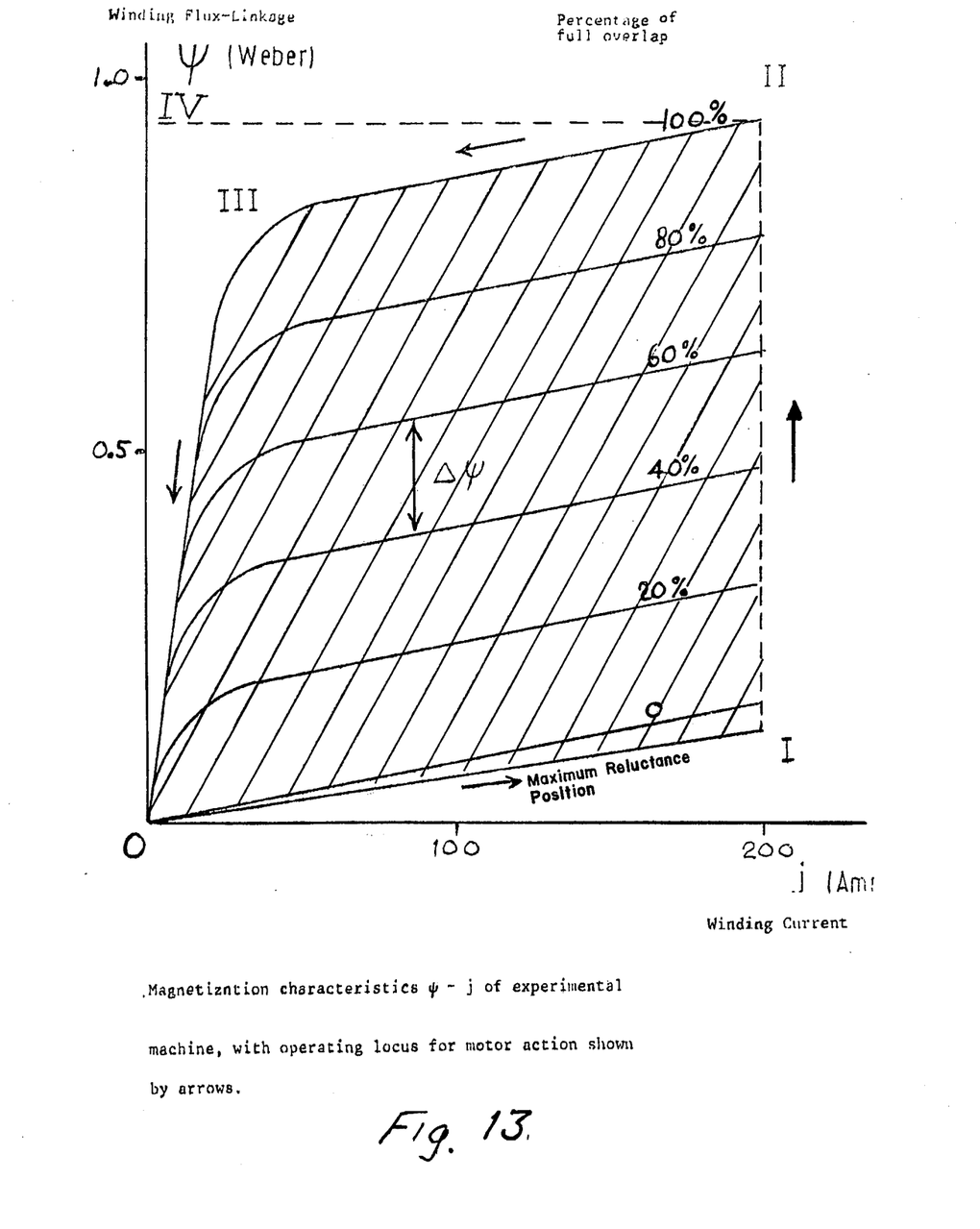
FIG. 13 is a diagram showing the relation of flux-linkage to current obtained experimentally with a machine constructed according to FIG. 1, FIGS. 14a and 14b are graphs of the phase ampere-turn waveshapes at low motor speed.

FIG. 13 shows measured characteristics obtained from an experimental machine constructed according to the invention. The six upper magnetization curves correspond to different degrees of pole overlap. The lowest corresponds to a maximum reluctance position of the rotor.

The ratio of the area $0 - I - II - III - 0$ representing energy converted and the area $0 - III - II - IV - 0$ representing the maximum energy stored is approximately 9 : 1. It will be noted that the increments $\Delta\psi$ are substantially position-dependent rather than current-dependent.

The cyclic process for electro-mechanical energy conversion (motor action) includes the four steps shown by arrows on FIG. 13 and begins when the rotor is in the maximum reluctance position. Step $0 - I$ shows the current increase to a working value when the flux increase is small. Step $I - II$ shows the flux increase at constant current when the rotor-stator overlap increases from a minimum to a maximum. Step $II - III$ shows the current being greatly reduced for small decrease in flux linkage. Step $III - 0$ shows the flux linkage being reduced to zero at substantially zero current, as the rotor poles move past the position of maximum overlap cross-section with the stator poles to reach a new position of maximum reluctance.

SUMMARY OF THE INVENTION

With the foregoing considerations in mind according to the present invention, high permeability ferromagnetic stationary and moving parts having pole surfaces separated by the smallest airgap consistent with mechanical clearance form magnetic paths of low reluctance except for highly saturated constriction zones of extent determined by the overlap between the poles, so that the magnetic flux is determined primarily by the position of the moving part and as little as possible by the intensity of the excitation current or currents. The constriction zone may be adjacent to the overlapping pole surfaces of both members or of either one, and its cross-section may be fully or partially of ferromagnetic material, any spacing material or slots having sufficient depth to ensure that only the ferromagnetic material offers a significant path to flux. Pole surfaces containing two or more effective densities of ferromagnetic material may be used to extend the mechanical displacement over which a uniform rate of flux increase occurs.

During the periods of increasing pole overlap (in the case of motor action) uni-directional currents giving uni-direction magneto motive forces are supplied to stator windings linking the corresponding flux paths. The mean values of the stator winding currents may be controlled by cyclic switching of the winding. During the periods of decreasing pole overlap, in the case of motor action, the current is suppressed, or reduced to a low value, in order to prevent the production of torques counter to the desired direction of torque. Suppression or reduction of the current to a low value is achieved by extracting from the winding the inductively stored energy and returning it to the source or storing it capacitively. For generator operation the "on" time for the current would coincide with periods of decreasing pole overlap.

The use of magnetic material having a narrow steep hysteresis loop with sudden onset of saturation, in a construction with small airgap gives low inductive energy storage, with correspondingly more complete conversion of instantaneous electrical input to mechanical output.

It is a characteristic of the invention that the magneto motive force (MMF) produced by said current at rated machine torque is, during the periods of high current and changing overlap, mainly developed across saturated pole regions in the vicinity of overlapping pole surfaces.

In the embodiment of the invention hereinafter described continuous rotation is achieved by combining two operationally independent machines, each of which provides positive torque over two 90° sectors, giving 360° coverage in all. In no sense are the machines designed to interact to give a traditional "2-phase" mode of operation. For this reason uni-directional currents may be used. The bridge-like magnetic circuit gives negligible coupling between the "phases", despite the common magnetic paths. The extension of the "working stroke" of each "phase" to over 90° is achieved by grading the effective mean iron density in the elongated rotor pole surfaces.

BRIEF DESCRIPTION OF THE DRAWINGS

The diagrams abovementioned together with FIGS. 1, 2, 3, 13 and 16 of the accompanying drawings, comprise the following:

FIG. 8 shows diagrammatically the magnetization characteristic of the extra flux addition shown in FIG. 7, FIGS. 9 and 10 compare the mechanical energy extracted for magentically linear and magnetically ideally-saturated cases for limited change in overlap, FIGS. 11 and 12 compare similarly the total mechanical energies which may be extracted.

DETAILED DESCRIPTION

Figure 1:
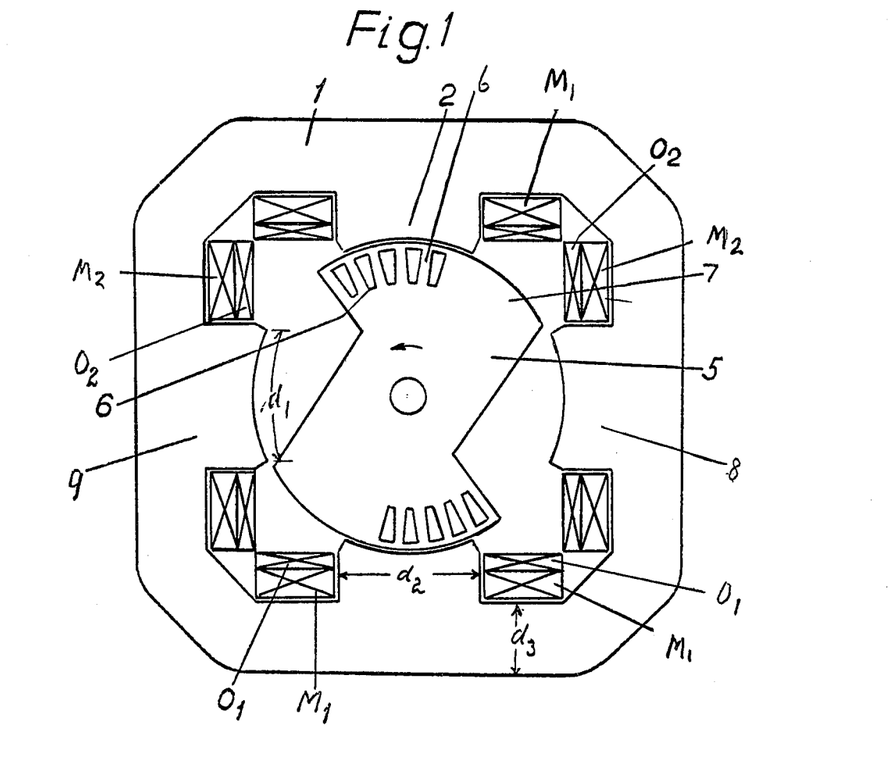
FIG. 1 is a diagrammatic view of the rotor and stator of a 2-phase motor in one embodiment.

Referring to FIG. 1 of the drawings the motor has a stator 1 of high permeability steel laminations with pole pieces 2, 3, 8 and 9 carrying windings $M_1$ and $M_2$, the windings $M_1$ of alternate poles combining to form one phase winding and the windings $M_2$ combining to form the second phase winding. The size and shape of the arcuate faces of the stator pole pieces 2 is such that the cross-sectional area of the path offered to magnetic flux in the machine is a minimum at the arcuate faces of the stator poles which define one side of the airgap between the connected arcuate faces of the poles of the stator 1 and rotor 5, where this airgap is of minimal width. The rotor 5 of high permeability steel laminations has half the number of poles of the stator. The angular extent of the rotor pole surface is approximately twice that of the stator. Approximately half of the rotor pole surface is undermined by deep trapezoidal slots 6 such that the rectangular portions remaining can, due to saturation, sustain a gap flux density of only one half of that provided by the unslotted pole surface 7. Advantageously the slots in one half the total number of laminations are displaced in position by one half a slot pitch.

It will be seen that as the slotted zone 6, moving anti-clockwise, begins to overlap the pole 2, the windings $M_1$ being excited, a flux increase linear with angular displacement is obtained. The said flux increase is caused to be mainly independent of the current intensity in the windings 3 by means of the magnetic saturation occuring in the rotor steel teeth 6', of uniform cross-section, formed by the punching of trapezoidal slots 6. The ampere-turns of the winding $M_1$ is caused to be almost totally developed across the rotor teeth 6' by selecting a radial airgap of not exceeding 10% of the distance in meters given by $4\pi \times 10^{-7}$ times the working ampere-turns per pole divided by the saturation flux-density (in tesla) of the ferro-magnetic material of the rotor.

When the slotted zone 6, 6' is fully aligned with the stator pole 2, the flux has reached one half of its maximum value. Further angular movement causes the unslotted pole surface 7 to overlap with stator pole 2 forming a saturated zone which has approximately double the saturation flux density of the slotted zone. The increase of flux with rotation continues linearly because the slotted rotor surface now moving away from under the stator pole represents only half the flux-carrying capacity of the unslotted surface now entering. In order that the said linear increase of flux with rotation shall continue until full alignment of the unslotted pole surface 7 of the rotor with the stator pole 2 is approached, magnetic saturation requires to be confined to the neighbourhood of the mechanically variable interface or overlap between stator and rotor poles. This is achieved by dimensioning the maximum cross-sectional area of the said variable interface, which area corresponds to the area of a stator pole face, to be less than the cross-section available to magnetic flux elsewhere in the magnetic flux path, and so cause the major constriction to flux to be located adjacent to the interface. Therefore, the dimension $d_1$ of the stator pole periphery is made about 20% less than the stator pole width $d_2$ by tapering the pole tips inwards as shown. The yoke thickness $d_3$ is made about 60% of the pole width $d_2$, these figures making some provision for leakage flux as will be clear to those skilled in the art.

To achieve a 90° "working stroke" per phase, so that torque can be developed continuously by sequential excitation of the phases, the rotor pole face arc is made 100° and the stator pole face arc is made 50°. Ideally, in an assumed absence of fringing flux, rotor pole face arc of 90° and stator pole face arc of 45° would be appropriate. The requirements can be generalised for machines having larger numbers of poles: the rotor pole arc (here 100°) should slightly exceed the stator pole pitch (here 90°); the rotor may have nay even number of poles, the stator requiring twice the said even number of poles; the total of the rotor pole-face peripheries and the total of the stator pole face peripheries should each exceed, by about 10%, half the total periphery available.

The periphery of the rotor interpolar space (approximately 80°) considerably exceeds that the stator pole face (here 50°) so that a large airgap exists in the flux path of phase 1 when the rotor is in the maximum reluctance position for phase 1. This gives desirably low pole fluxes in the said position. Hence the mechanical output work at constant current is about 80% of the theoretically maximum value. By contrast, in prior art stepping motors the corresponding mechanical work per step is typically well under one half of the theoretically possible value.

In order to largely retain the above favourable magnetization characteristic in other embodiments, the peripheral interpolar space should exceed by at least 20% the peripheral extent of each stator pole face.

The angular position of the rotor, appropriate for suppression of the current in the phase windings $M_1$ and initiation of current in the phase windings $M_2$ is detected by a shaft-driven position sensor, which may be of electro-magnetic, optical or magneto-diode type, and may include provision to automatically advance the initiation of switching as the speed increases.

Figure 2:
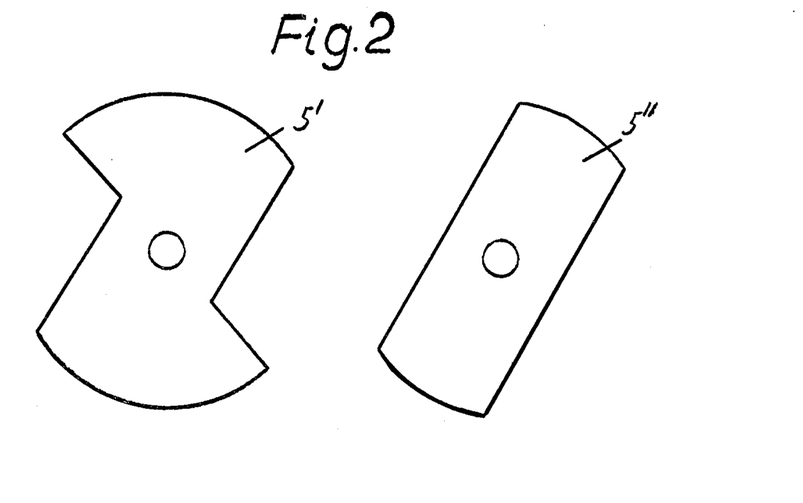
FIG. 2 shows modified rotor components suitable for use with the stator shown in FIG. 1.

An alternative rotor construction uses the lamination shapes illustrated in FIG. 2. Laminations $5''$ of short pole arc corresponding to that of the stator poles are interleaved with laminations $5'$ having approximately double the pole arc of laminations $5''$. The combination gives a pole surface having two densities of ferro-magnetic material in the required ratio of 2 : 1.

Advantageously the rotors of FIGS. 1 and 2 may be given a cylindrical outline of reduced windage loss by the filling of the interpolar spaces with a suitable material.

Figure 3:
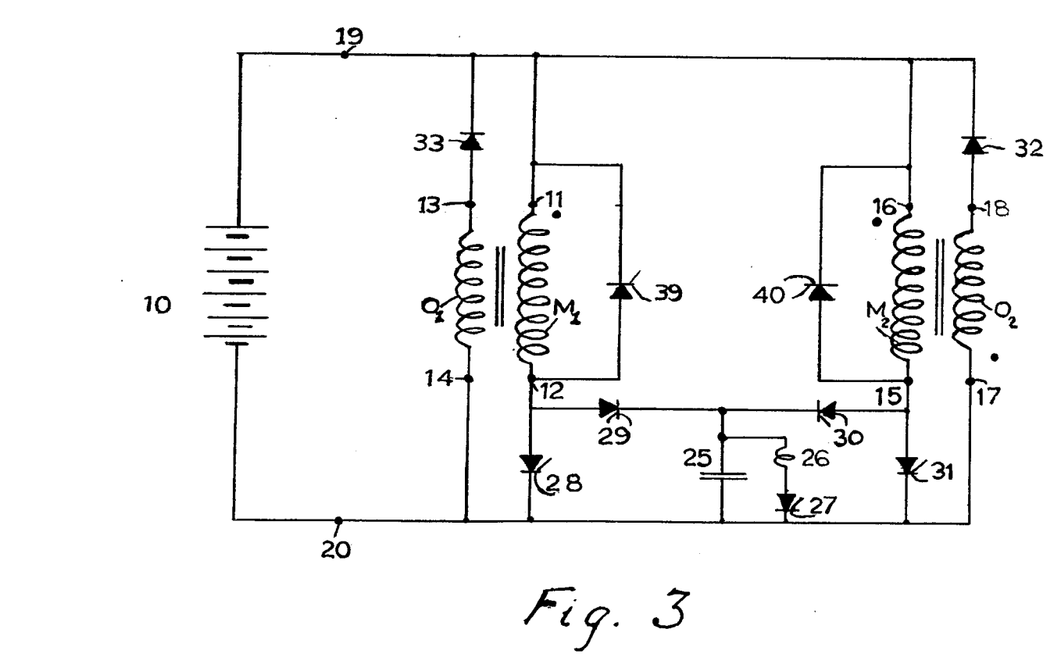
FIG. 3 is a power circuit diagram for the control of the motor of FIG. 1, FIGS. 4 and 5 are diagrams showing the pole overlap zone for magnetically linear and magnetically saturated cases respectively.

Referring to FIG. 3, $M_1$ and $O_1$ indicate the closely coupled main and auxiliary windings pertaining to one phase of the motor of FIG. 1. $M_2$ and $O_2$ are a similar pair of windings pertaining to the second phase. $M_1$ and $M_2$ are the main phase windings and occupy the major part of the winding space. The auxiliary windings $O_1$ and $O_2$, designated "overwind", have the function of returning inductively stored energy to the battery 10. Main thyristor 28 connects winding $M_1$ to the battery 10. Free-wheel thyristor 39 presents a short-circuit to winding $M_1$. During the period of increasing rotor overlap, the current in $M_1$ is kept within limits by sequential switching of 28 and 29, 39 being commutated automatically by 28. Commutation thyristor 29, capacitor 25, inductor 26 and auxiliary thyristor 27 is a commutating circuit with the function of force commutating thyristor 28. 33 is a diode which, made conducting by both thyristors 39 and 28 beingsimulatneously blocked, causes the winding ampere-turns to decay rapidly as inductively stored energy is returned to the battery. The thyristors 31, 30, 40 and diode 32 have corresponding functions in being simultaneously to the second phase winding $M_2$ and $O_2$. The mode of operation will be clear to one familiar with D.C. chopper regulators.

Figure 14A:
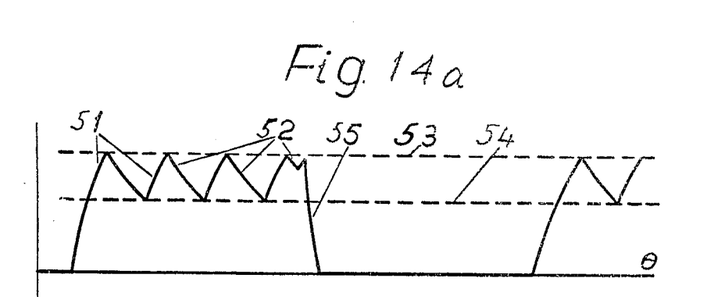
Figure 14B:
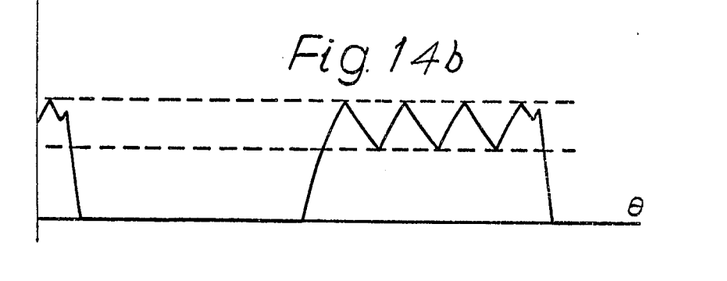

Referring to FIG. 14a, illustrating waveforms at low speed, the segments 51 correspond to the rise of current in the main winding $M_1$ (of FIG. 3) when the main thyristor 28 is conducting. The segments 52 correspond to the fall of current in the main winding when the free-wheel thyristor 39 is conducting. The upper current limit 53 and the lower current limit 54 are effective during the period of positive torque when pole overlap is increasing. The segment 55 corresponds to the more rapid fall of current in the overwinding $O_1$ (of FIG. 3) when the diode 33 conducts, this switching being initiated by signals from a shaft-driven phase sensor. FIG. 14b shows the corresponding waveforms for the phase windings $M_2$ and $O_2$ (FIG. 3). In a less efficient mode of operation, the free-wheel thyristors 39 and 40 are omitted.

Figure 15A:
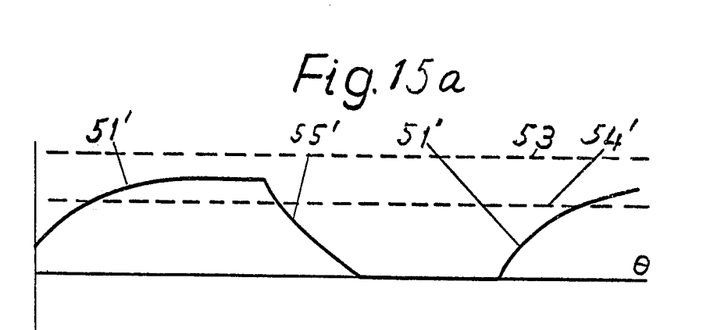
FIGS. 15a and 15b are graphs of the phase ampere-turn waveshapes at high motor speed.
Figure 15B:
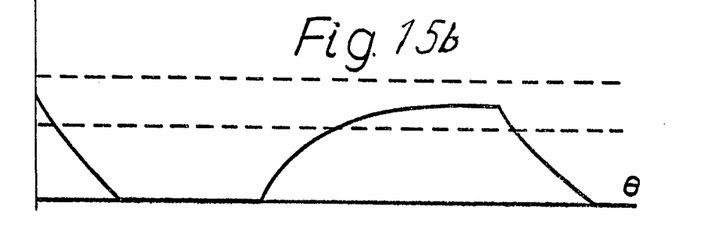

In FIG. 15a segment 51' corresponds to the rise of current in the main winding $M_1$ (of FIG. 3). The speed voltage is such that the upper current limit 3 is not reached. Segment 55' corresponds to the decay of current in the over-winding $O_1$. FIG. 15b shows corresponding conditions in the windings of the other phase. The free-wheel thyristors 39 and 40 are inoperative and all switching is initiated by a shaft-driven phase sensor.

Figure 16:
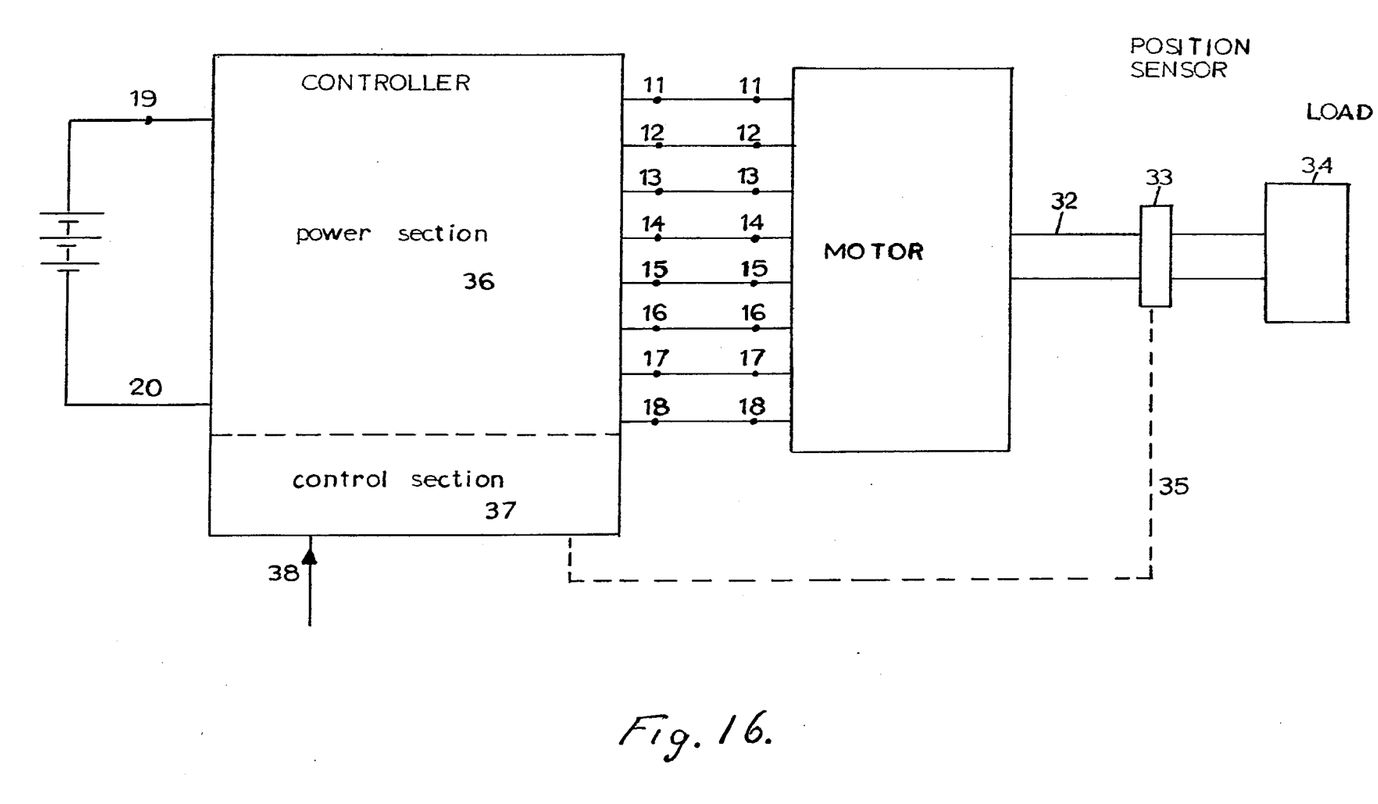
FIG. 16 is a block diagram of the complete system.

The preferred mode of operation of the improved electrodynamic system according to the invention will be evident from the following more detailed description with reference to the block diagram in FIG. 16.

As shown in FIG. 16, the motor has its shaft 32 connected to a position sensor 33 and a mechanical load 34 in which the mechanical work output is absorbed. A controller made up of a power section 36 and a control section 37 has output terminals 11, 12, 13, 14, 15, 16, 17, connected to correspondingly numbered terminals of the motor main and auxiliary windings. A battery DC source 10 has its positive terminal connected to power input terminal 19 of the power section 36 and its negative terminal to power input terminal 20 of the power section 36. A signal generated by position sensor 33 corresponding to the angular position of shaft 32 and hence to the angular position of the motor rotor is coupled to the control section 37 as indicated by the broken line 25. A signal representative of a desired torque is also applied to control section 37 as indicated by arrow 38.

Referring to the power circuit FIG. 3, the complete system FIG. 4 and to FIG. 1 the system operation will now be described. S.C.R.s 30, S.C.R.s,29,39. winding Assuming initially that the desired torque signal 38 is zero and the motor is stopped with the rotor 6 in the position relative to poles 2 and 8 shown in FIG. 1. This initial position is taken merely for convenience in explanation, the system produces torque at rest with any rotor position. Poles 2 and 3 are each wound with one half the turns of winding $M_1$ and one half the turns of winding $O_1$, the corresponding half windings on each pole being connected in series or parallel to form the complete windings $M_1$ and $O_1$ shown in FIG. 3. A signal from position sensor 33 to control section 37 in FIG. 16 enables gate signals to be directed to single or combinations of silicon controller rectifiers (S.C.R.s) 27, 28, 29, 39 under supervision of control section 37 FIG. 16 which are associated with winding $M_1$ and inhibits direction of gate signals to S.C.R.s 30, 31 and 40. As the desired torque signal is zero a gate signal will be applied by control section 37 to S.C.R.s 29,39. Commutating capacitor 25 will be charged from the battery 10 through the windings $M_1$ and S.C.R. 29 with the upper plate positive with respect to the lower plate. As is known, due to the inductance associated with winding $M_1$ the voltage on capacitor 25 will tend to rise to approximately twice the voltage of battery 10. The charging voltage of capacitor 25 is limited to that of battery 10 by S.C.R. 39 conducting as the potential of its anode rises above the cathode which is connected to battery postive terminal 19. Both S.C.R.s then self-commutate.

If now the desired torque signal changes to some positive value, gate signals are directed by control section 37 to S.C.R.s 28 and 27. The circuit formed by commutation capacitor 35, inductor 36 and S.C.R. 27 reverses the charge on capacitor 25. S.C.R. 27 self-commutates when this occurs. Simultaneous with the reversed process current starts to rise in the circuit comprising battery 10 winding $M_1$ and S.C.R. 28, and motoring torque is produced. When the current, sensed by any sensing means associated with the circuit has risen to a level corresponding to that set in control section 37 by the desired torque signal 38 a gate signal is directed to S.C.R. 29 which causes forced commutation of S.C.R. 28 by discharging capacitor 25 througn it, a gate signal is also directed to S.C.R. 39. When S.C.R. 28 commutates, capacitor 25 recharges until S.C.R. 39 conducts and S.C.R. 29 self-commutates. The winding current now "free wheels" through the short current path provided by S.C.R. 39 until it falls to some predetermined value when control section 37 again directs gate signals to S.C.R.s 28 and 27 causing the current to start to rise again in winding $M_1$ and the charge on capacitor 25 to reverse. This process repeats giving a current in $M_1$, the torque causing rotation of the rotor 5 and shaft 32 until the rotor 6 FIG. 1 comes with its maximum iron density section under poles 2 and 3. At this time the signal from the position sensor 33 indicates to control section 37 the end of the working stroke for this winding, this information is momentarily stored in the control section 37.

The current in $M_1$ at this time may be being supplied from the battery 10 via S.C.R. 28 or may be free-wheeling through S.C.R. 39. If the current in winding $M_1$ is rising a gate signal is directed by the control section 37 to S.C.R. 29 but not as before also to S.C.R. 39. S.C.R. 28 is forced to commutate as before and capacitor 25 recharges. This time however as S.C.R. 39 is not gated the voltage at winding $M_1$ terminal 12 rises above that of positive battery terminal 19 to a level defined by the turns ratio of $M_1/O_1$ multiplied by the voltage of battery 10. When this level is reached, as windings $M_1$ and $O_1$ are closely coupled, terminal 13 of winding $O_1$ will tend to rise above the voltage of battery 10 and diode 32 will conduct. The residual energy stored in the magnetic field originally associated with winding $M_1$ will now appear as a current flow back to the battery 10 as the field collapses, the circuit being that of winding $O_1$ and diode 33 and battery 10.

If however the current in winding M is free-wheeling through S.C.R. 39 control section 37 will first direct a gate signal to S.C.R. 28 causing it to conduct thus commutating S.C.R. 39. A gate signal is also directed to S.C.R. 27 to reverse the charge on capacitor 25. Immediately after this a gate signal is directed to S.C.R. 29 to commutate S.C.R. 23 and energy recuperation back to battery 10 takes place as already described.

Once S.C.R. 29 has been gated the information from the position sensor 33 already stored in control section 377 inhibits further direction of gate signals to S.C.R.s 28, 29, 39 and enables gate signals to be directed to S.C.R.s 30, 31 and 40. Immediately S.C.R.s 27 and 31 are gated causing the growth of current in winding $M_2$ and reversal of charge on capacitor 25. Control section 37 operation on S.C.R.s 30, 31 and 40 associated with winding $M_2$ is as already described for winding $M_1$. When the maximum from density section of rotor 5 comes into alignment with pole 9 FIG. 1 operation of winding $M_2$ is terminated as described for winding $M_1$ and winding $M_1$ is energised, thus producing continuous rotation of shaft 32.

If the desired torque signal is set to its maximum value and the condition of load 35 is such as to allow maximum speeed with full power operation of the motor the current in whichever winding is energised will not rise above the upper level set by control section 37 and will remain essentially constant until terminated by control section 23 gating the appropriate S.C.R. either 29 or 30 as directed by position sensor 33. In this mode of operation the current waveforms will be as in FIG. 6, control section 37 advancing the switching from $M_1$ to $M_2$ relative to rotor 5 position as speed increases. Alternately this advance may be accomplished manually by moving the stationary portion of position sensor 33 to provide torque control at high speed. This mode is similar to field weakening control in a chopper fed series rotor.

A less efficient mode of low speed operation is also possible in which S.C.R.s 39 and 40 are omitted. In this mode when the current in the operating winding rises above the upper value set by control section 37 and the appropriate series S.C.R. 29 or 31 is forced to commutate, free-wheeling occurs via the appropriate auxiliary winding $O_1$ or $O_2$ and series diode back to the battery 10. Due to the more rapid rate of fall of current, the current ripple frequency is increased over the previously described mode of operation resulting in higher commutation and motor losses which may be acceptable in applications where mainly full speed operation is required.

The term "electric power source" used herein is intended to include any source or sink of electric power, according to the context.

We claim:
1. A process for controlling current in a variable-reluctance machine comprising the following steps in cyclic order:
   a. coupling a source of electrical energy across the main field winding of the machine until the current therein reaches a predetermined value
   b. decoupling the source of electrical energy from the main field winding when the current reaches a predetermined value
   c. transferring the ampere-turns of the main winding to an auxiliary winding closely coupled therewith, without discontinuity
   d. coupling the auxiliary winding to the source of electrical energy in the sense to direct current back to the source
   e. free-wheeling the current in the auxiliary winding back to the source by the voltage generated by decay of flux linking said auxiliary winding until the current falls to a predetermined value, this being a fixed percentage of the predetermined maximum value of the current in the main winding
   f. transferring to and reinforcing the current in the main winding by again coupling the main winding to the power source
   g. again decoupling the source of electrical energy from the main winding when the current reaches a predetermined value
   h. returning current to the source under the induced voltage generated in the coupled auxiliary winding by the decay of flux linking said auxiliary winding until the current is zero.

2. The process as claimed in claim 1 in which the free-wheeling step (e) comprises free-wheeling the current in the main winding under the induced voltage generated in that winding by the decay of magnetic flux linking that winding until the current therein falls to a predetermined percentage of its original value.

3. An electrodynamic system according to claim 1, an additional controlled unidirectional switching means (39 or 40) connected directly across terminals of each main field winding ($M_1$ or $M_2$).

4. An electromagnetic system comprising, in combination, a variable-reluctance machine having a stator and a rotor both entirely comprised of highly permeable ferromagnetic material, the stator having salient poles defining a set of arcuate pole faces, stator field windings in two phase groups, the windings of each group being on alternate pairs of stator poles, the rotor having a set of arcuate pole faces, and switching means dependent on rotor position for sequentially connecting said stator field winding groups to an electric power source without reversal of stator pole magnetic polarities, each stator pole face sequentially closely confronting the arcuate pole faces of the rotor as the latter rotates, the stator, with alternate poles in two phase groups, having twice the number of poles compared with the number of rotor poles, each rotor pole having substantially twice the peripheral extent of each stator pole, the leading half, for a given rotational sense, of each rotor pole surface having therein deep trapezoidal slots, whereby the rectangular tooth-like portions between the slots can, because of saturation, sustain a gap flux-density of only one half that provided by the unslotted trailing half of each rotor pole surface, the trailing half of each rotor pole surface being uninterrupted and formed wholly of said ferromagnetic material, whereby the mechanical displacement of the rotor over which a uniform rate of flux increase occurs is extended to one stator pole pitch, thus providing torque continuity with a two-phase configuration.

5. An electrodynamic system according to claim 4 having a laminated rotor in which the trapezoidal slots in one half of the total number of laminations are displaced in position by one half a slot pitch with respect to the slots in the other half of the laminations.

6. An electrodynamic system according to claim 4 having a laminated rotor and comprising laminations of short pole are corresponding approximately to that of the stator poles, interleaved with laminations having approximately double said pole arc, the density of ferromagnetic material adjacent to the leading edge being substantially less than the density of ferromagnetic material adjacent to the trailing edge.

7. An electromagnetic system according to claim 4, in which each stator pole tapers to the arcuate pole face.

8. An electrodynamic system comprising a variable reluctance machine having a ferro-magnetic salient-pole rotor without windings and a ferro-magnetic salient-pole stator with field windings, said stator and rotor poles having respectively concentric arcuate faces defining a minimal airgap of arcuate form, and the cross-sectional area of the path offered to magnetic flux in the machine being a minimum at said stator pole faces to provide intense magnetic saturation restricted to the inter-face areas when said stator and rotor pole faces overlap in closest proximity during rotation, and switching means to sequentially and intermittently connect said stator windings to a direct current electric power source, an auxiliary field winding on each stator pole additional to the main field winding thereon but of lower rating and closely coupled therewith, controlled unidirectional switching means to sequentially connect the main field windings to the electrical power means, uncontrolled unidirectional switching means to connect the auxiliary field windings to the same electrical power source, said windings and switching means being arranged so that the stator pole flux is unidirectional while the power flow is in the direction from said source and towards the main field windings as well as when said power flow is directed towards said source from said auxiliary field windings.

* * * * *